United States Patent
Hashimoto et al.

(10) Patent No.: US 12,556,039 B2
(45) Date of Patent: Feb. 17, 2026

(54) GROUND POWER SUPPLY APPARATUS, NONCONTACT POWER SUPPLY SYSTEM, CONTROL METHOD FOR GROUND POWER SUPPLY APPARATUS, AND COMPUTER PROGRAM

(71) Applicants: TOYOTA JIDOSHA KABUSHIKI KAISHA, Aichi (JP); DENSO CORPORATION, Aichi (JP)

(72) Inventors: Toshiya Hashimoto, Miyoshi (JP); Kazutaka Kimura, Mishima (JP); Makoto Hashimoto, Seto (JP); Masaki Kanesaki, Susono (JP); Keisuke Tani, Kariya (JP); Nobuhisa Yamaguchi, Kariya (JP); Kazuyoshi Obayashi, Kariya (JP); Yuichi Takemura, Kariya (JP)

(73) Assignees: TOYOTA JIDOSHA KABUSHIKI KAISHA, Aichi (JP); DENSO CORPORATION, Aichi (JP)

( * ) Notice: Subject to any disclaimer, the term of this patent is extended or adjusted under 35 U.S.C. 154(b) by 14 days.

(21) Appl. No.: 18/843,703

(22) PCT Filed: Feb. 22, 2023

(86) PCT No.: PCT/JP2023/006530
§ 371 (c)(1),
(2) Date: Sep. 4, 2024

(87) PCT Pub. No.: WO2023/171393
PCT Pub. Date: Sep. 14, 2023

(65) Prior Publication Data
US 2025/0183713 A1    Jun. 5, 2025

(30) Foreign Application Priority Data
Mar. 7, 2022   (JP) .................. 2022-034850

(51) Int. Cl.
*H02J 50/10* (2016.01)
*B60L 53/39* (2019.01)
(Continued)

(52) U.S. Cl.
CPC .............. *H02J 50/10* (2016.02); *B60L 53/39* (2019.02); *B60L 53/65* (2019.02); *B60L 53/66* (2019.02); *B60L 53/68* (2019.02); *H02J 50/402* (2020.01)

(58) Field of Classification Search
CPC .......... H02J 50/10; H02J 50/402; H02J 50/40; H02J 2310/48; H02J 7/00045; H02J 50/80;
(Continued)

(56) References Cited

U.S. PATENT DOCUMENTS 10,543,754 B2 *   1/2020  Jang ..................... B60L 53/665

FOREIGN PATENT DOCUMENTS

JP          2018-157686 A    10/2018

* cited by examiner

*Primary Examiner* — Xiao En Mo
(74) *Attorney, Agent, or Firm* — HAUPTMAN HAM, LLP

(57) ABSTRACT

A ground power supply apparatus is provided with a control device configured to supply power to a mobile unit by noncontact if identification information of the mobile unit received from a server and stored in a storage device matches identification information of the mobile unit received from the mobile unit. The control device is configured to change a timing of deletion of identification information of the mobile unit received from the server and stored in the storage device from the storage device or the timing of invalidation of the identification information of the mobile unit received from the server and stored in the storage device based on the road conditions around the road (Continued)

at which the ground power supply apparatus is installed or the running path of the mobile unit.

14 Claims, 9 Drawing Sheets

(51) Int. Cl.
*B60L 53/65* (2019.01)
*B60L 53/66* (2019.01)
*B60L 53/68* (2019.01)
*H02J 50/40* (2016.01)

(58) Field of Classification Search
CPC . H02J 50/60; H02J 50/12; B60L 53/39; B60L 53/65; B60L 53/66; B60L 53/68; B60L 2240/68; B60L 53/36; G08G 1/202; G08G 1/017; G16Y 10/40; G16Y 20/20; G16Y 40/10
See application file for complete search history.

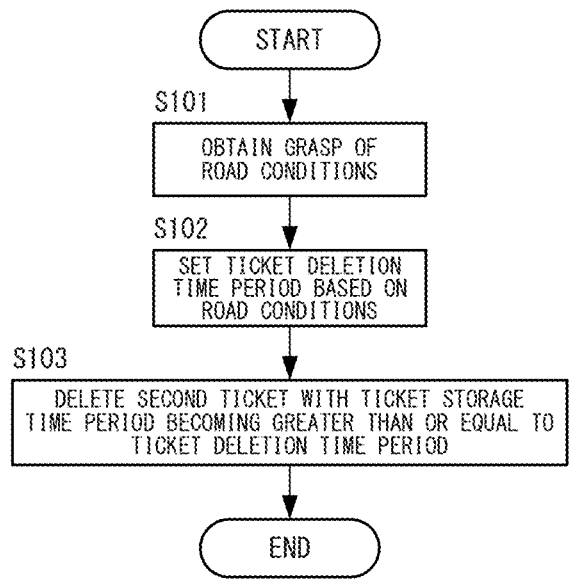
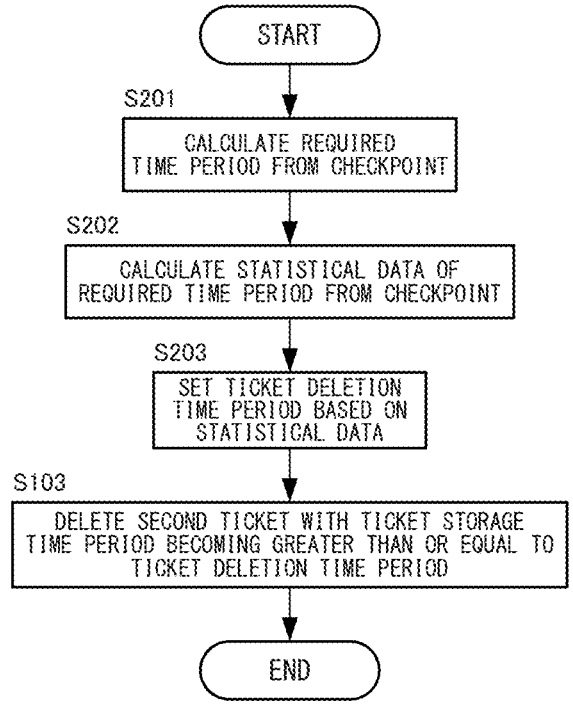

GROUND POWER SUPPLY APPARATUS, NONCONTACT POWER SUPPLY SYSTEM, CONTROL METHOD FOR GROUND POWER SUPPLY APPARATUS, AND COMPUTER PROGRAM

RELATED APPLICATIONS

The present application is a National Phase of International Application No. PCT/JP2023/006530 filed Feb. 22, 2023, which claims priority to Japanese Application No. 2022-034850 filed Mar. 7, 2022.

FIELD

The present invention relates to a ground power supply apparatus, a noncontact power supply system, a control method for a ground power supply apparatus, and a computer program.

BACKGROUND

JP2018-157686A discloses a noncontact power supply system which utilizes a transmission system such as magnetic field coupling (electromagnetic induction), electric field coupling, magnetic field resonant coupling (magnetic field resonance), and electric field resonant coupling (electric field resonance) to transmit electric power from a ground power supply apparatus provided on the ground to a running vehicle by noncontact.

SUMMARY

A ground power supply apparatus has to confirm whether a vehicle running toward it is a vehicle with permission of utilization of the noncontact power supply system. Therefore, to enable a ground power supply apparatus to confirm that, it is necessary to transmit in advance to each ground power supply apparatus which has the possibility of being run on by a vehicle with permission of system use the identification information for identifying that vehicle (for example, a virtual ticket issued to a vehicle obtaining permission of system use etc.) Therefore, each ground power supply apparatus has to store the received identification information. However, from the viewpoint of the storage capacity of a ground power supply apparatus, the prevention of theft of electric power by a third party, etc., it is necessary to delete or cancel at a suitable timing any identification information ending up remaining without being used since the vehicle did not run on it.

The present invention was made focusing on such a problem and has as its object to enable deletion or invalidation of identification information of a vehicle which may run on a ground power supply apparatus stored in the ground power supply apparatus at a suitable timing.

To solve the above problem, a ground power supply apparatus according to one aspect of the present invention is provided with a communication device able to communicate with a server and a mobile unit respectively and a control device having a storage device and configured to supply power to the mobile unit by noncontact if identification information of the mobile unit received from the server and stored in the storage device matches identification information of the mobile unit received from the mobile unit. Further the control device is configured to change a timing of deletion of identification information of the mobile unit received from the server and stored in the storage device from the storage device or the timing of invalidation of the identification information of the mobile unit received from the server and stored in the storage device based on the road conditions around the road at which the ground power supply apparatus is installed or the running path of the mobile unit.

Further, to solve the above problem, a noncontact power supply system according to another aspect of the present invention is provided with a server, a mobile unit, and a ground power supply apparatus having a storage device and configured to be able to communicate with the server and the mobile unit respectively and configured to be able to supply power to the mobile unit by noncontact. Further, the ground power supply apparatus is configured to supply power to the mobile unit by noncontact if identification information of the mobile unit received from the server and stored in the storage device matches identification information of the mobile unit received from the mobile unit and further is configured to change the timing of deletion of identification information of the mobile unit received from the server and stored in the storage device from the storage device or the timing of invalidation of the identification information of the mobile unit received from the server and stored in the storage device based on the road conditions around the road at which the ground power supply apparatus is installed or the running path of the mobile unit.

Further, to solve the above problem, a control method for a ground power supply apparatus according to another aspect of the present invention supplies power to a mobile unit by noncontact if identification information of the mobile unit received from a server and stored in a storage device matches identification information of the mobile unit received from the mobile unit and changes the timing of deletion of identification information of the mobile unit received from the server and stored in the storage device from the storage device or the timing of invalidation of the identification information of the mobile unit received from the server and stored in the storage device based on the road conditions around the road at which the ground power supply apparatus is installed or the running path of the mobile unit.

Further, to solve the above problem, a computer program according to another aspect of the present invention is a computer program for a computer for controlling a ground power supply apparatus provided with a communication device able to communicate with a server and a mobile unit respectively and a storage device, which makes the ground power supply apparatus supply power to the mobile unit by noncontact if identification information of the mobile unit received from the server and stored in the storage device matches identification information of the mobile unit received from the mobile unit and changes the timing of deletion of identification information of the mobile unit received from the server and stored in the storage device from the storage device or the timing of invalidation of the identification information of the mobile unit received from the server and stored in the storage device based on the road conditions around the road at which the ground power supply apparatus is installed or the running path of the mobile unit.

According to these aspects of the present invention, it is possible to delete from the ground power supply apparatus or invalidate the identification information of a vehicle which has the possibility of running on a ground power supply apparatus at a suitable timing based on the road conditions around the road at which the ground power supply apparatus is installed or the running path of the mobile unit.

BRIEF DESCRIPTION OF THE DRAWINGS

FIG. 6 is a flow chart for explaining processing for deletion of a second ticket according to a first embodiment of the present invention.

FIG. 7 is a flow chart for explaining processing for deletion of a second ticket according to a second embodiment of the present invention.

DESCRIPTION OF EMBODIMENTS

Figure 1:
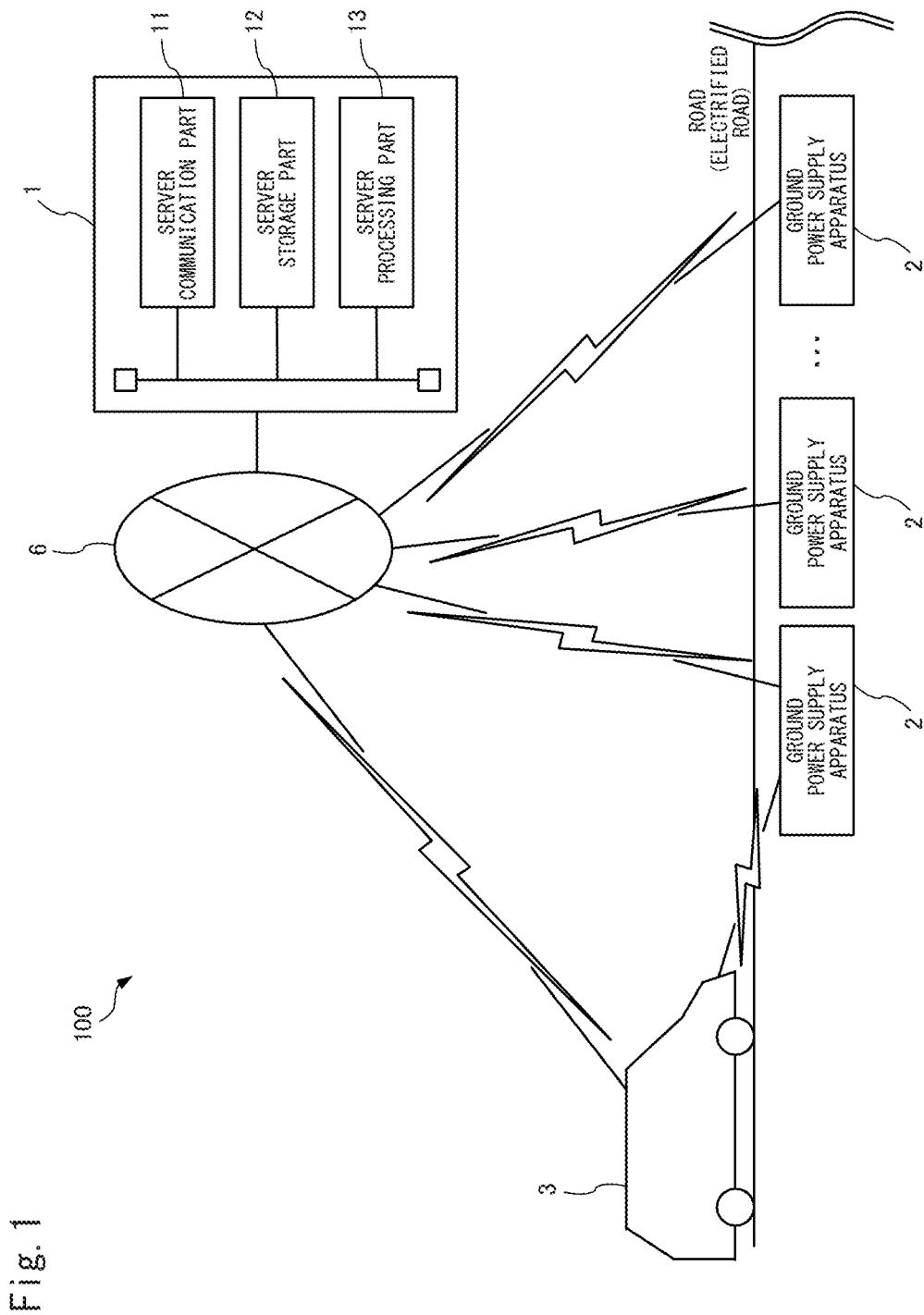
FIG. 1 is a schematic view of the configuration of a noncontact power supply system.

Below, embodiments will be explained in detail while referring to the drawings. Note that, in the following explanation, similar component elements will be assigned the same reference notations.

First Embodiment

FIG. 1 is a schematic view of the configuration of a noncontact power supply system 100 according to a first embodiment of the present invention.

The noncontact power supply system 100 is provided with a server 1, a ground power supply apparatus 2, and a vehicle 3 as one example of a mobile unit and is configured to be able to supply a running or stopped vehicle 3 obtaining permission of system use with power from the ground power supply apparatus 2 by noncontact using magnetic field resonant coupling (magnetic field resonance). Note that, in FIG. 1, as one example of installation of the ground power supply apparatus 2, the example is shown where ground power supply apparatuses 2 are installed consecutively along the road at predetermined intervals. In the following explanation, a road at which ground power supply apparatuses 2 are installed will be referred to as an "electrified road" in accordance with need.

Note that, in this Description, the term "run" means the state where the vehicle 3 is positioned on the road for running. Therefore, the term "run" includes not only the state where the vehicle 3 is actually running by any speed larger than zero, but also the state where for example it is stopped on the road waiting for a traffic light to change etc.

As shown in FIG. 1, the server 1 is provided with a server communication part 11, server storage part 12, and server processing part 13.

The server communication part 11 has a communication interface circuit for connecting the server 1 to a network 6 and is configured to enable the ground power supply apparatus 2 and the vehicle 3 to communicate through the network 6.

The server storage part 12 has an HDD (hard disk drive) or SSD (solid state drive), optical recording medium, semiconductor memory, or other storage medium and stores various computer programs, data, etc. used for processing at the server processing part 13.

The server processing part 13 has one or more CPUs (central processing units) and their peripheral circuits. The server processing part 13 runs the various computer programs stored in the server storage part 12 and exerts comprehensive control over the overall operations of the server 1. It is, for example, a processor.

Figure 2:
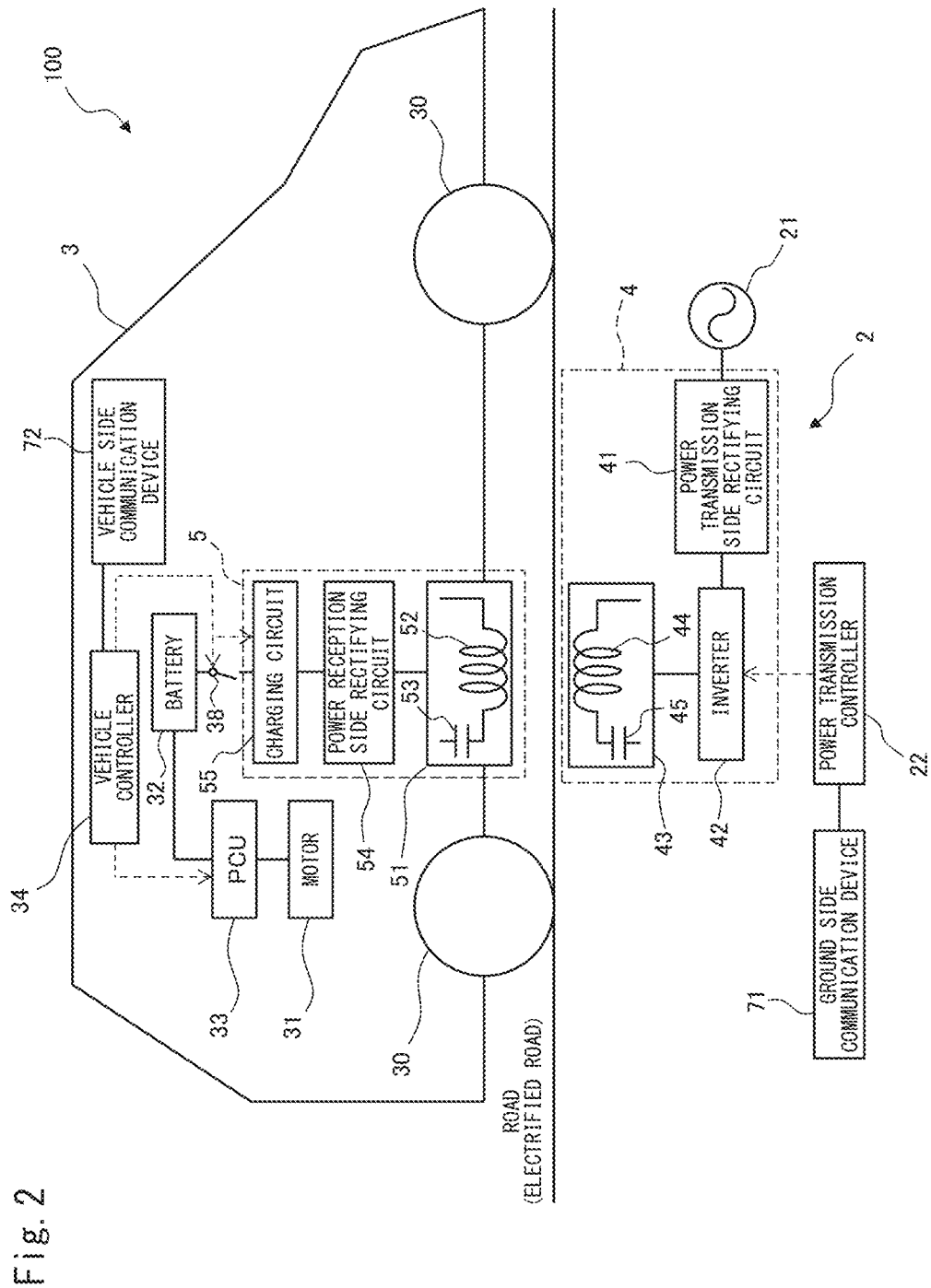
FIG. 2 is a view showing one example of the configurations of a ground power supply apparatus and vehicle.

Next, referring to FIG. 2 to FIG. 4, the configurations of the ground power supply apparatus 2 and vehicle 3 according to the present embodiment will be explained. FIG. 2 is a view showing one example of the configurations of the ground power supply apparatus 2 and vehicle 3 according to the present embodiment.

As shown in FIG. 2, the ground power supply apparatus 2 has a ground side communication device 71, power transmission device 4, power source 21, and power transmission controller 22. The ground side communication device 71, power source 21, and power transmission controller 22 may be buried in the road or may be placed at a location other than the road (including on the ground).

The ground side communication device 71 is configured to be able to communicate with the server 1, the vehicle 3, an outside communication center, etc.

In the present embodiment, the ground side communication device 71 is configured to access a wireless base station connected through the network 6, a gateway, etc. to thereby enable connection with the network 6 through the wireless base station. Due to this, wide area wireless communication is performed between the ground side communication device 71 and the server 1. For example, various information required for supplying power to the vehicle 3 by noncontact is swapped. Wide area wireless communication is communication with a longer communication distance compared with the later explained narrow area wireless communication. Specifically, for example, it is communication with a communication distance of from 10 meters to 10 kilometers. As wide area wireless communication, various wireless communication standards with long communication distances can be used. For example, communication based on any communication standards such as 4G, LTE, 5G, WiMAX, etc. formulated by the 3GPP and IEEE is used.

Further, in the present embodiment, the ground side communication device 71 is configured to be able to utilize a predetermined wireless communication channel to engage in narrow area wireless communication directly with a vehicle side communication device 72 mounted in the vehicle 3. Narrow area wireless communication is communication with a shorter communication distance compared with wide area wireless communication. Specifically, for example, it is communication with a communication distance of less than 10 meters. As narrow area wireless communication, various near field communication standards with short communication distances can be used. For example, communication based on any communication standards (for example, Bluetooth (Registered Trademark) or ZigBee (Registered Trademark)) formulated by the IEEE, ISO, IEC, etc. is used. Further, as technology for narrow area wireless communication, for example, RFID (radio frequency identification), DSRC (dedicated short range communication), etc. are used.

Further, in the present embodiment, the ground side communication device 71 is configured so as to be able to communicate with, for example, a road traffic information center or other outside communication center and receive outside information. The outside information, for example, is the amount of traffic or length of congestion in an electrified road section where the ground power supply apparatus 2 is installed, an average speed of the vehicles, vehicle average passage time, or other road traffic information.

The power source 21 supplies power to the power transmission device 4. The power source 21 is, for example, a commercial AC power source supplying single-phase AC power. Note that, the power source 21 may also be another AC power source supplying three-phase AC power or may be a DC power source such as a fuel cell.

The power transmission device 4 transmits the power supplied from the power source 21 to the vehicle 3. The power transmission device 4 has a power transmission side rectifying circuit 41, inverter 42, and power transmission side resonance circuit 43. In the power transmission device 4, the AC power supplied from the power source 21 is rectified at the power transmission side rectifying circuit 41 and converted to DC current, the DC current is converted to AC current at the inverter 42, and that AC power is supplied to the power transmission side resonance circuit 43.

The power transmission side rectifying circuit 41 is electrically connected to the power source 21 and inverter 42. The power transmission side rectifying circuit 41 rectifies the AC power supplied from the power source 21 to convert it to DC power and supplies the DC power to the inverter 42. The power transmission side rectifying circuit 41 is for example an AC/DC converter.

The inverter 42 is electrically connected to the power transmission side rectifying circuit 41 and power transmission side resonance circuit 43. The inverter 42 converts the DC power supplied from the power transmission side rectifying circuit 41 to AC power of a frequency higher than the AC power of the power source 21 (high frequency power) and supplies the high frequency power to the power transmission side resonance circuit 43.

The power transmission side resonance circuit 43 has a resonator comprised of a coil 44 and capacitor 45. The various parameters of the coil 44 and capacitor 45 (outside diameter and inside diameter of coil 44, number of turns of coil 44, electrostatic capacity of capacitor 45, etc.) are determined so that the resonance frequency of the power transmission side resonance circuit 43 becomes a set value. The predetermined set value is, for example, 10 kHz to 100 GHz, preferably is the 85 kHz determined by the SAE TIR J2954 standard as the frequency band for noncontact power transmission.

The power transmission side resonance circuit 43 is arranged at the center of a lane in which the vehicle 3 passes so that the center of the coil 44 is positioned at the center of the lane. If the high frequency power supplied from the inverter 42 is applied to the power transmission side resonance circuit 43, the power transmission side resonance circuit 43 generates an AC magnetic field for power transmission. Note that, if the power source 21 is a DC power source, the power transmission side rectifying circuit 41 may be omitted.

The power transmission controller 22 performs various control over the ground power supply apparatus 2. For example, the power transmission controller 22 is electrically connected to the inverter 42 of the power transmission device 4 and controls the inverter 42 so as to control the power transmission by the power transmission device 4. Further, the power transmission controller 22 communicates with the server 1 and the vehicle 3 through the ground side communication device 71. Note that the vehicle 3 can be directly communicate with through the ground side communication device 71 and can be indirectly communicated with from the ground side communication device 71 through the server 1.

Figure 3:
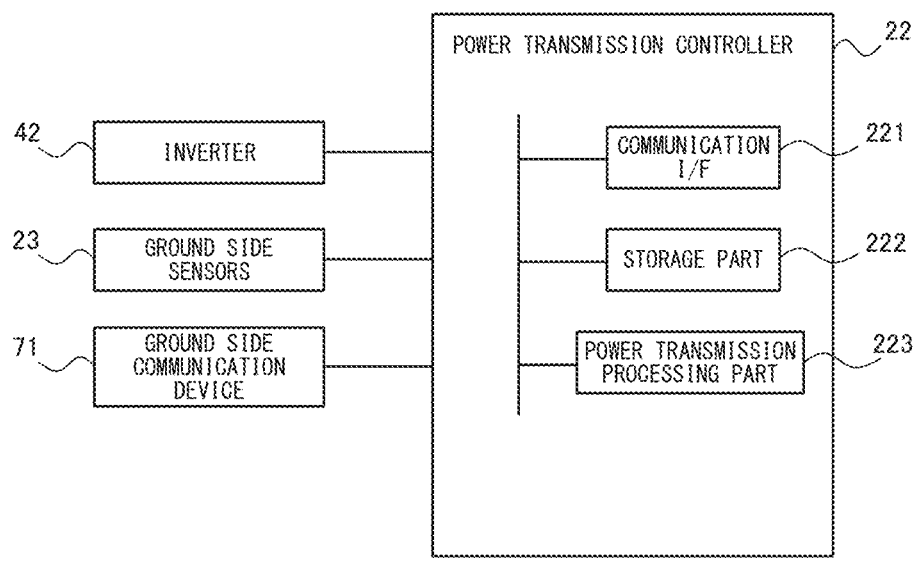
FIG. 3 is a schematic view of the configurations of a power transmission controller and equipment connected to the power transmission controller.

FIG. 3 is a schematic view of the configurations of the power transmission controller 22 and equipment connected to the power transmission controller 22.

The power transmission controller 22 is provided with a communication interface 221, storage part 222, and power transmission processing part 223. The communication interface 221, storage part 222, and power transmission processing part 223 are connected with each other through signal wires.

The communication interface 221 has an interface circuit for connecting the power transmission controller 22 to the various equipment forming the ground power supply apparatus 2 (for example, inverter 42, ground side communication device 71, later explained ground side sensors 23, etc.) The power transmission controller 22 communicates with the various equipment forming the ground power supply apparatus 2 through the communication interface 221.

The storage part 222 has an HDD or SSD, optical recording medium, semiconductor memory, or other storage medium and stores various computer programs, data, etc. used for processing at the power transmission processing part 223.

The power transmission processing part 223 has one or more CPUs (central processing units) and their peripheral circuits. The power transmission processing part 223 runs the various computer programs stored in the storage part 222 and exerts comprehensive control over the overall operations of the ground power supply apparatus 2. It is, for example, a processor.

The power transmission controller 22 has ground side sensors 23 connected to it. The ground side sensors 23, for example, include a power transmission device current sensor for detecting the current flowing through the various parts of the power transmission device 4 (in particular, the power transmission side resonance circuit 43, inverter 42, and power transmission side rectifying circuit 41), a power transmission device voltage sensor for detecting the voltage applied to the various parts of the power transmission device 4, a power transmission device temperature sensor for detecting the temperature of the various parts of the power transmission device 4, a foreign object sensor for detecting a foreign object on the road in which the power transmission device 4 is buried, and a bio sensor for detecting a person or animal on the road at which the power transmission device 4 is buried. The outputs of the ground side sensors 23 are input to the power transmission controller 22.

Returning to FIG. 2, the vehicle 3 has a vehicle side communication device 72, power reception device 5, motor 31, battery 32, power control unit (PCU) 33, and vehicle controller 34. The vehicle 3 according to the present embodiment is a battery electric vehicle (BEV) having only the battery 32 as its source of drive power, but may also be a so-called hybrid vehicle provided with an internal combustion engine or other drive source in addition to the battery 32 (HEV; hybrid electric vehicle or PHEV; plug-in hybrid electric vehicle). The type is not particularly limited.

The vehicle side communication device 72 is configured to be able to communicate with the server 1 and ground power supply apparatus 2. In the present embodiment, the vehicle side communication device 72 is configured to be able to access a wireless base station connected with the network 6 through a gateway etc. and thereby connect with the network 6 through the wireless base station. Due to this, wide area wireless communication is performed between the vehicle side communication device 72 and server 1.

Further, the vehicle side communication device 72 is configured to be able to utilize a predetermined wireless communication channel to directly engage in narrow area wireless communication with the ground side communication device 71 of the ground power supply apparatus 2.

The motor 31 is, for example, an AC synchronous motor and functions as an electric motor and a generator. When functioning as an electric motor, the motor 31 is driven by the power stored in the battery 32 as the drive source. The output of the motor 31 is transmitted through a speed reducer and axle to the wheels 30. On the other hand, when the vehicle 3 is decelerating, the motor 31 is driven by rotation of the wheels 30 whereby the motor 31 functions as a generator to generate regenerative power.

The battery 32 is a rechargeable secondary battery and is, for example, comprised of a lithium ion battery, nickel hydrogen battery, etc. The battery 32 stores the power required for the vehicle 3 to run (for example, drive power of the motor 31). The battery 32 is charged if the power received by the power reception device 5 is supplied to the battery 32. Further, the battery 32 is charged if the regenerative power generated by the motor 31 is supplied to the battery 32. If the battery 32 is charged, the state of charge (SOC) of the battery 32 is restored. Note that, the battery 32 may also be charged by an outside power source other than the ground power supply apparatus 2 through a charging port provided at the vehicle 3.

The PCU 33 is electrically connected to the battery 32 and motor 31. The PCU 33 has an inverter, boost converter, and DC/DC converter. The inverter converts the DC power supplied from the battery 32 to AC power and supplies the AC power to the motor 31. On the other hand, the inverter converts the AC power generated by the motor 31 (regenerative power) to DC power and supplies the DC power to the battery 32. When the power stored in the battery 32 is supplied to the motor 31, the boost converter boosts the voltage of the battery 32 in accordance with need. The DC/DC converter lowers the voltage of the battery 32 when the power stored in the battery 32 is supplied to headlights or other electronic equipment.

The power reception device 5 supplies power received from the power transmission device 4 to the battery 32. The power reception device 5 has a power reception side resonance circuit 51, power reception side rectifying circuit 54, and charging circuit 55.

The power reception side resonance circuit 51 is arranged at the bottom part of the vehicle 3 so that the distance from the road surface becomes smaller. The power reception side resonance circuit 51 has a configuration similar to the power transmission side resonance circuit 43 and has a resonator comprised of a coil 52 and capacitor 53. The various parameters of the coil 52 and capacitor 53 (outside diameter and inside diameter of the coil 52, number of turns of the coil 52, electrostatic capacity of the capacitor 53, etc.) are determined so that the resonance frequency of the power reception side resonance circuit 51 matches with the resonance frequency of the power transmission side resonance circuit 43. Note that, if the amount of deviation of the resonance frequency of the power reception side resonance circuit 51 and the resonance frequency of the power transmission side resonance circuit 43 is small, for example, if the resonance frequency of the power reception side resonance circuit 51 is within a range of ±20% of the resonance frequency of the power transmission side resonance circuit 43, the resonance frequency of the power reception side resonance circuit 51 does not necessarily have to match the resonance frequency of the power transmission side resonance circuit 43.

When the power reception side resonance circuit 51 is facing the power transmission side resonance circuit 43 and an AC magnetic field is generated by the power transmission side resonance circuit 43, the vibration of the AC magnetic field is transmitted to the power reception side resonance circuit 51 resonating by the same resonance frequency as the power transmission side resonance circuit 43. As a result, an induced current flows to the power reception side resonance circuit 51 by electromagnetic induction and an induced electromotive force is generated at the power reception side resonance circuit 51 by the induced current. That is, the power transmission side resonance circuit 43 transmits power to the power reception side resonance circuit 51, while the power reception side resonance circuit 51 receives power from the power transmission side resonance circuit 43.

The power reception side rectifying circuit 54 is electrically connected to the power reception side resonance circuit 51 and charging circuit 55. The power reception side rectifying circuit 54 rectifies the AC power supplied from the power reception side resonance circuit 51, converts it to DC power, and supplies the DC power to the charging circuit 55. The power reception side rectifying circuit 54 is, for example, an AC/DC converter.

The charging circuit 55 is electrically connected to the power reception side rectifying circuit 54 and battery 32. In particular, it is connected to the battery 32 through a relay 38. The charging circuit 55 convert the DC power supplied from the power reception side rectifying circuit 54 to the voltage level of the battery 32 and supplies it to the battery 32. The battery 32 is charged if the power transmitted from the power transmission device 4 is supplied by the power reception device 5 to the battery 32. The charging circuit 55 is, for example, a DC/DC converter.

The vehicle controller 34 performs various control over the vehicle 3. For example, the vehicle controller 34 is electrically connected to the charging circuit 55 of the power reception device 5 and controls the charging circuit 55 to control the charging of the battery 32 by the power transmitted from the power transmission device 4. Further, the vehicle controller 34 is electrically connected to the PCU 33 and controls the PCU 33 to control the transfer of power between the battery 32 and the motor 31. Furthermore, the vehicle controller 34 controls the vehicle side communication device 72.

Figure 4:
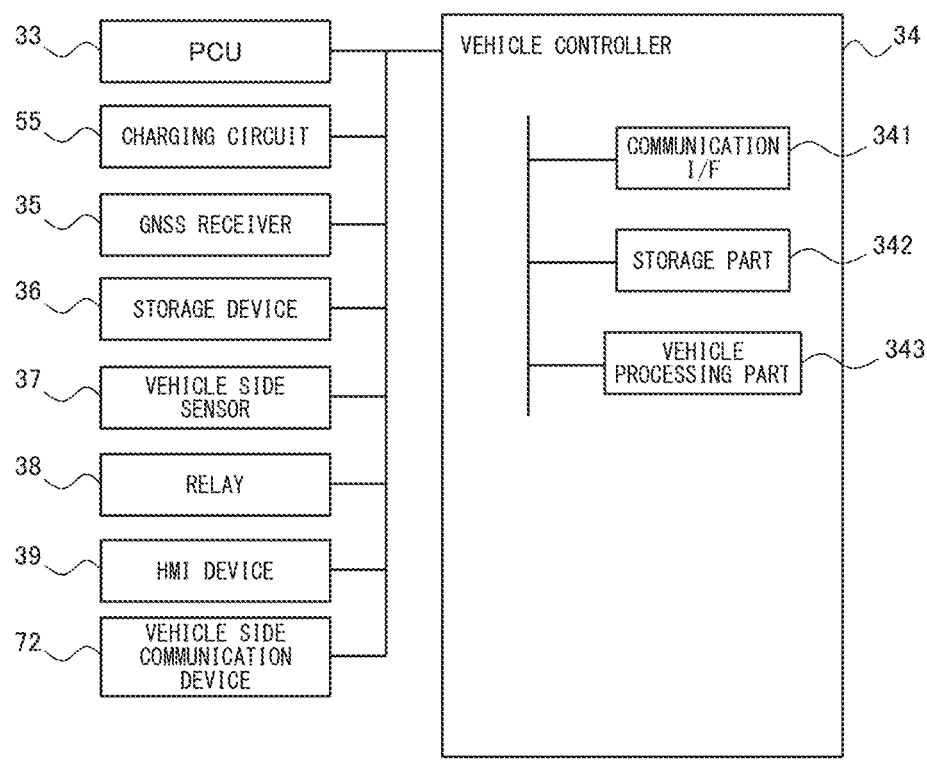
FIG. 4 is a schematic view of the configurations of a vehicle controller and equipment connected to the vehicle controller.

FIG. 4 is a schematic view of the configuration of the vehicle controller 34 and equipment connected to the vehicle controller 34.

The vehicle controller 34 has a communication interface 341, storage part 342, and vehicle processing part 343. The communication interface 341, storage part 342, and vehicle processing part 343 are connected with each other through signal wires.

The communication interface 341 has an interface circuit for connecting the vehicle controller 34 to an internal network based on the CAN or the standard. The vehicle controller 34 communicates with other equipment through the communication interface 341.

The storage part 342 has an HDD or SSD, optical recording medium, semiconductor memory, or other storage medium and stores the various computer programs, data, etc. used for processing at the vehicle processing part 343.

The vehicle processing part 343 has one or more CPUs (central processing units) and their peripheral circuits. The vehicle processing part 343 runs the various computer programs stored in the storage part 342 and exerts comprehensive control over the overall operations of the vehicle 3. It is, for example, a processor.

Further, the vehicle 3 is further provided with a GNSS receiver 35, storage device 36, a plurality of vehicle side sensors 37, the relay 38, and an HMI device 39. The GNSS receiver 35, storage device 36, vehicle side sensors 37, relay 38, and HMI device 39 are electrically connected to the vehicle controller 34 through the internal network.

The GNSS receiver 35 detects the current position of the vehicle 3 (for example, the latitude and longitude of the vehicle 3) based on positioning information obtained from a plurality of (for example, three or more) positioning satellites. The output of the GNSS receiver 35, that is, the current position of the vehicle 3 detected by the GNSS receiver 35, is transmitted to the vehicle controller 34.

The storage device 36 stores data. The storage device 36 is, for example, provided with an HDD, SSD (solid state drive), or optical recording medium. In the present embodiment, the storage device 36 stores map information. The map information includes, in addition to information relating to roads, information on installation positions of the ground power supply apparatuses 2 and other information. The vehicle controller 34 acquires map information from the storage device 36. Note that, the storage device 36 need not contain map information. In that case, the vehicle controller 34 may acquire map information from outside the vehicle 3 (for example, the server 1) through the vehicle side communication device 72.

The vehicle side sensors 37 detect the state of the vehicle 3. In the present embodiment, the vehicle side sensors 37 include, as sensors for detecting the state of the vehicle 3, a speed sensor for detecting the speed of the vehicle 3, a battery temperature sensor for detecting the temperature of the battery 32, a power reception device temperature sensor for detecting the temperature of the various parts of the power reception device 5 (in particular, the power reception side resonance circuit 51 and power reception side rectifying circuit 54), a battery current sensor for detecting a charging current value and discharging current value of the battery 32, a power reception device current sensor for detecting the current flowing to the various parts of the power reception device 5, and a power reception device voltage sensor for detecting the voltage applied to the various parts of the power reception device 5. The outputs of the vehicle side sensors 37 are input to the vehicle controller 34.

The relay 38 is arranged between the battery 32 and the power reception device 5 and connects and disconnects the battery 32 and the power reception device 5. When the relay 38 is connected, the power which the power reception device 5 receives is supplied to the battery 32. However, when the relay 38 is disconnected, current does not flow from the power reception device 5 to the battery 32 and accordingly the power reception device 5 can substantially no long receive power.

The HMI device 39 is an interface for transferring information with occupants of the vehicle. The HMI device 39 according to the present embodiment is provided with a display and speaker for providing the vehicle occupants with various types of information and a touch panel (or operating buttons) for the vehicle occupants to enter information. The HMI device 39 transmits input information entered by the vehicle occupants through the internal network to various devices requiring that input information (for example, the vehicle controller 34) and provides the vehicle occupants with the information received through the internal network by showing it on the display etc.

Figure 5:
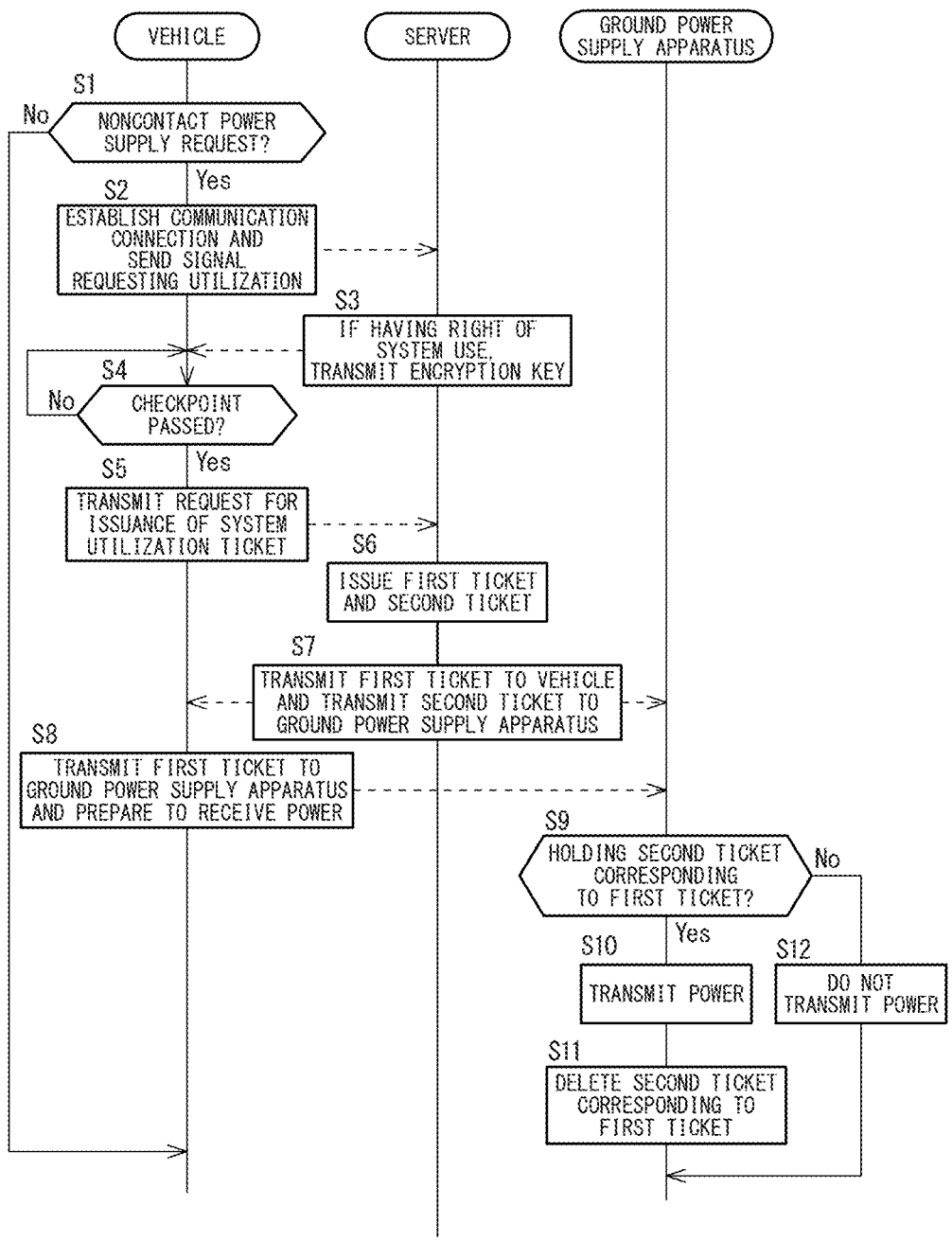
FIG. 5 is an operation sequence diagram for explaining the method of supplying power by a noncontact power supply.

Next, referring to the operation sequence diagram of FIG. 5, the method of supplying power by noncontact power supply according to the present embodiment will be explained.

At step S1, the vehicle controller 34 judges whether the vehicle 3 in which that vehicle controller 34 is mounted (host vehicle) is requesting noncontact power supply. If the host vehicle 3 is requesting noncontact power supply, the vehicle controller 34 proceeds to the processing of step S2. On the other hand, if the host vehicle 3 is not requesting noncontact power supply, the processing vehicle controller 34 ends the processing. In the present embodiment, the vehicle occupants are made able to manually switch between requesting noncontact power supply or not through the HMI device 39, but the invention is not limited to this. For example, it also possible to automatically switch between requesting noncontact power supply or not in accordance with the state of charge of the battery 32.

At step S2, the vehicle controller 34, for example, performs a three-way handshake to establish communication connection with the server 1, then transmits to the server 1 a signal requesting utilization of the noncontact power supply system 100. This signal requesting utilization includes, for example, various information required for utilizing the noncontact power supply system 100 (for example authentication information etc.)

At step S3, the server 1 confirms whether the vehicle 3 originating the signal requesting utilization has the right to utilize the noncontact power supply system 100 based on the authentication information etc. and transmits to the confirmed vehicle 3 an encryption key for decrypting an encrypted system utilization ticket explained later.

At step S4, the vehicle controller 34 judges whether a checkpoint set at a point before the electrified road section has been passed. If the checkpoint has been passed, the vehicle controller 34 proceeds to the processing of step S5. On the other hand, if the checkpoint has not been passed, the vehicle controller 34 again judges if the checkpoint has been passed after the elapse of a predetermined time.

Whether or not the checkpoint has been passed can be judged, for example, by the vehicle controller 34 receiving a signal generated from a gate if a gate is set at the checkpoint. At this time, the vehicle controller 34 can receive checkpoint information, including position information of the checkpoint passed etc., from the gate. Further, for example, if the checkpoint information is included in map information in the storage device 36 or if the checkpoint information can be received from the server 1, it is possible to judge whether the checkpoint has been passed based on the position information of the host vehicle 3 and the position information of the checkpoint. In this way, the method for judging whether the checkpoint has been passed is not particularly limited.

Note that, in the present embodiment, at this step S4, whether the checkpoint has been passed is judged, but the invention is not limited to this. For example, whether the checkpoint has been approached may also be judged.

Whether the checkpoint has been approached can, for example, by judged by the vehicle controller 34 receiving a signal generated from an apparatus transmitting a signal to a vehicle 3 positioned within a certain fixed range based on the checkpoint if such an apparatus is installed at the checkpoint. The invention is not limited to this. This can also be judged based on the position information of the host vehicle 3 and the position information of the checkpoint. The certain fixed range based on the checkpoint can, for example, be made a partial road section before entering an electrified road section if a road section of a predetermined range where a signal change is awaited so as to enable a vehicle awaiting a signal change to be supplied with power by noncontact is an electrified road section.

At step S5, the vehicle controller 34 transmits to the server 1 a request for issuance of a virtual ticket for utilization of the noncontact power supply system 100 as a system utilization ticket together with identification information of the host vehicle and the checkpoint information.

At step S6, if receiving a request for issuance of a system utilization ticket, the server 1 identifies the vehicle 3 originating the request for issuance based on the identification information. Further, the server 1 issues a first ticket comprised of a system utilization ticket for transmission to the identified vehicle 3 originating the request for issuance and a system utilization ticket unique to each vehicle 3 having the right to utilize the noncontact power supply system 100. Further, the server 1 simultaneously with this issues a second ticket comprised of a system utilization ticket corresponding to the first ticket and a system utilization ticket for transmission to a ground power supply apparatus 2.

At step S7, the server 1 transmits an encrypted first ticket to the vehicle 3 originating the request for issuance of the system utilization ticket and transmits the second ticket to each ground power supply apparatus 2 linked with the checkpoint. A "ground power supply apparatus 2 linked with the checkpoint" is a ground power supply apparatus 2 installed in an electrified road section which a vehicle 3 passing the checkpoint may run on. The server storage part 12 of the server 1 according to the present embodiment stores in advance the ground power supply apparatuses 2 linked with a checkpoint for each checkpoint.

At step S8, the vehicle controller 34 decrypts the received first ticket using the encryption key and controls the power reception device 5 so as to start periodic and direct transmission of the decrypted first ticket to the ground power supply apparatus 2 through the vehicle side communication device 72 by narrow area wireless communication and be able to receive power when the host vehicle 3 is running on the ground power supply apparatus 2.

At step S9, if receiving the first ticket by greater than or equal to a predetermined communication strength (strength of received signal), the power transmission controller 22 of the ground power supply apparatus 2 judges if it has already received from the server 1 a second ticket corresponding to the received first ticket, that is, if it holds a second ticket corresponding to the received first ticket. If holding a second ticket corresponding to the first ticket, the power transmission controller 22 proceeds to the processing of step S10. On the other hand, if not holding a second ticket corresponding to the first ticket, the ground power supply apparatus 2 proceeds to the processing of step S11.

At step S10, the power transmission controller 22 of the ground power supply apparatus 2 judges whether the vehicle 3 is a vehicle which will run on or stop at the apparatus is requesting noncontact power supply and has obtained permission of system use of the noncontact power supply system 100 (below, referred to as a "vehicle for power supply") and controls the power transmission device 4 so as to be able to transmit power when that vehicle 3 is running on or parked at the apparatus.

At step S11, if transmitting power to the vehicle 3 running on or stopped at that apparatus, the power transmission controller 22 of the ground power supply apparatus 2 deletes the second ticket corresponding to the first ticket received from that vehicle 3 from the storage part 222.

At step S12, the power transmission controller 22 of the ground power supply apparatus 2 judges that the vehicle 3 which will run on or stop at that apparatus in the future is not a vehicle for power supply and controls the power transmission device 4 so as not to transmit power even if that vehicle 3 runs on or stops at that apparatus.

In this way, in the present embodiment, to enable it to be confirmed at the ground power supply apparatus 2 if a vehicle 3 approaching that apparatus is a vehicle for power supply, the server 1 is configured to transmit a first ticket to the vehicle for power supply and transmit a second ticket corresponding to the first ticket to the ground power supply apparatus 2 which that vehicle for power supply may run on (identification information for the ground power supply apparatus 2 to identify whether the vehicle 3 approaching that apparatus is a vehicle for power supply).

Further, the ground power supply apparatus 2 is configured to store the second ticket received from the server 1 in the storage part 222 of the power transmission controller 22 and, if the second ticket stored in the storage part 222 and the first ticket received from the vehicle 3 approaching that apparatus match, to judge that the vehicle 3 is a vehicle for power supply and supply power by noncontact and delete the second ticket corresponding to the first ticket received from that vehicle 3 from the storage part 222.

That is, in the present embodiment, each ground power supply apparatus 2 on which a vehicle for power supply might run is transmitted a second ticket, so sometimes a second ticket is transmitted to a ground power supply apparatus 2 installed in an electrified road section where a vehicle for power supply did not run. In this case, the second ticket stored in the storage part 222 of the power transmission controller 22 of the ground power supply apparatus 2 ends up remaining stored in the storage part 222 without being deleted, so, for example, it is necessary to delete the second ticket stored in the storage part 222 from the storage part 222 at a suitable timing so as to prevent theft of electric power by a third party forging the first ticket and, further, to enable the stored data of the storage part 222 to be kept down.

Therefore, in the present embodiment, among the second tickets stored in the storage part 222 of the power transmission controller 22 of the ground power supply apparatus 2, if there is a second ticket with an elapsed time period from when received from the server 1 (below, referred to as the "ticket storage time period") of greater than or equal to a predetermined ticket deletion time period, that second ticket is deleted from the storage part 222. Further the ticket deletion time period may also be set to a suitable time period in accordance with the road conditions.

Below, referring to the flow chart of FIG. 6, processing for deletion of the second ticket according to the present embodiment which the power transmission controller 22 performs will be explained. The power transmission controller 22 repeatedly performs this routine at predetermined processing periods.

At step S101, the power transmission controller 22 of the ground power supply apparatus 2 obtains a grasp of for example the degree of congestion or other road conditions at the electrified road section where that apparatus is installed.

The road conditions at the electrified road section where that apparatus is installed can be grasped by, for example, communicating with an outside road traffic information center through the ground side communication device 71 and acquiring from the road traffic information center at least one parameter required for obtaining a grasp the road conditions of the electrified road section at which that apparatus is installed. As such a parameter, for example, the amount of traffic or length of congestion of the electrified road section at which that apparatus is installed, the average speed of the vehicles, the average time for passage through the section, etc. may be mentioned.

At step S102, the power transmission controller 22 of the ground power supply apparatus 2 sets the ticket deletion time period based on the road conditions of the electrified road section at which that apparatus is installed.

In the present embodiment, the power transmission controller 22 judges the degree of congestion of the electrified road section at which that apparatus is installed from the road conditions of that electrified road section and increases the ticket deletion time period the higher the degree of congestion of that electrified road section. This is because the time period required from the checkpoint to that apparatus becomes longer the higher the degree of congestion of the electrified road section at which that apparatus is installed. The degree of congestion of the electrified road section basically becomes higher the greater the amount of traffic, the longer the congestion length, the lower the average speed of the vehicles, and the longer the average time period for passage through the section.

At step S103, the power transmission controller 22 of the ground power supply apparatus 2 checks if among the second tickets stored in the storage part 222, there is any second ticket with a ticket storage time period of greater than or equal to the ticket deletion time period and, if there is a second ticket with a ticket storage time period of greater than or equal to the ticket deletion time period, deletes that second ticket from the storage part 222.

The ground power supply apparatus 2 according to the present embodiment explained above has the ground side communication device 71 (communication device) able to communicate with the server 1 and the vehicle 3 (mobile unit) respectively and the power transmission controller 22 (control device) having the storage part 222 (storage device) and configured to supply power to the vehicle 3 by noncontact when a second ticket received from the server 1 and stored in the storage part 222 (identification information of the mobile unit) matches with a first ticket received from the vehicle 3 (identification information of the mobile unit). Further, the power transmission controller 22 is configured to change the timing of deletion from the storage part 222 of a second ticket received from the server 1 and stored in the storage part 222 based on the road conditions around the road at which the ground power supply apparatus 2 is installed.

Due to this, even if the ground power supply apparatus 2 received from the server 1 a second ticket for identifying a vehicle 3 which did not run on that apparatus, it is possible to delete that second ticket from the storage part 222 of that apparatus at a suitable timing based on the road conditions around the road at which that apparatus is installed.

In particular, in the present embodiment, the power transmission controller 22 is configured so that when the ticket storage time period, constituted by the elapsed time from when receiving a second ticket from the server 1, becomes greater than or equal to a predetermined ticket deletion time period, it deletes the second ticket received from the server 1 and stored in the storage part 222 and changes the ticket deletion time period based on the road conditions around the road at which the ground power supply apparatus 2 is installed. Specifically, the power transmission controller 22 is configured to lengthen the ticket deletion time period when the degree of congestion of the road at which the ground power supply apparatus 2 is installed is high compared to when it is low and is configured to judge the degree of congestion of the road at which the ground power supply apparatus 2 is installed based on at least one parameter of the amount of traffic of the road, the length of congestion, the average speed of the vehicles, and the average passage time of the vehicles.

Due to this, it is possible to delete the second ticket from the storage part 222 of the ground power supply apparatus 2 at a suitable timing corresponding to the current road conditions around the road at which that apparatus is installed.

Further, in the present embodiment, a computer program for use for a computer controlling the ground power supply apparatus 2 provided with the ground side communication device 71 (communication device) able to communicate with the server 1 and the vehicle 3 (mobile unit) respectively and the storage part 222 (storage device) is used to make the ground power supply apparatus 2 supply power to the vehicle 3 by noncontact when the second ticket received from the server 1 and stored in the storage part 222 (identification information of the mobile unit) matches the first ticket received from the vehicle 3 (identification information of the mobile unit) and changes the timing of deletion from the storage part 222 of the second ticket received from the server 1 and stored in the storage part 222 based on the road conditions around the road at which the ground power supply apparatus 2 is installed.

Due to this, even if the ground power supply apparatus 2 receives from the server 1 a second ticket for identifying a vehicle 3 which as a result did not run on that apparatus, the ground power supply apparatus 2 can delete the received second ticket from the storage part 222 of that apparatus at a suitable timing based on the road conditions around the road at which that apparatus is installed.

Second Embodiment

Next, a second embodiment of the present invention will be explained. The present embodiment differs from the first embodiment on the point of setting the ticket deletion time period based on statistical data of the time periods required from the checkpoint of vehicles 3 to the ground power supply apparatus. Below, the explanation will be given focusing on this point of difference.

FIG. 7 is a flow chart for explaining processing for deletion of the second ticket according to the present embodiment. The power transmission controller 22 repeatedly performs the present routine at predetermined periods. Note that, in FIG. 7, the content of the processing of step S103 is similar to the first embodiment, so the explanation will be omitted here.

At step S201, if transmitting power to the vehicle 3 running on the ground power supply apparatus 2, the power transmission controller 22 of that apparatus calculates the time period required from when receiving from the server 1 the second ticket used for confirmation of whether that vehicle 3 is a vehicle for power supply to when transmitting power, that is, the required time period necessary for the vehicle 3 for power supply to run from the checkpoint to that apparatus, and stores this in the storage part 222. In this way, in the present embodiment, each time transmitting power to a vehicle 3, the required time period for that vehicle 3 to run from the checkpoint to that apparatus is acquired and is stored in the storage part 222 of the power transmission controller 22.

At step S202, the power transmission controller 22 of the ground power supply apparatus 2 calculates statistical data of the required time periods of vehicles 3 from the checkpoint to that apparatus acquired up to then. The statistical data can, for example, be made the average value, center value, or most frequent value of the required time periods of vehicles 3 from the checkpoint to that apparatus, but the invention is not limited to these.

At step S203, the power transmission controller 22 of the ground power supply apparatus 2 sets the ticket deletion time period based on the statistical data of the required time periods from the checkpoint to that apparatus. In the present embodiment, the power transmission controller sets the ticket deletion time period by multiplying the statistical data with a predetermined coefficient larger than 1.

The power transmission controller 22 according to the present embodiment explained above (control device) is configured so that, each time supplying power to a vehicle 3 (mobile unit) by noncontact, it calculates the required time from when receiving the second ticket (identification information of the mobile unit) from the server 1 to when supplying power to the vehicle 3 by noncontact and stores it in the storage part 222 (storage device) and changes a ticket deletion time period based on statistical data of the required time periods obtained from a plurality of data of the required time periods stored in the storage part 222.

Due to this, the ground power supply apparatus 2 according to the present embodiment can delete the second ticket from the storage part 222 of that apparatus at a suitable timing based on the past road conditions around the road at which that apparatus is installed even if it can no longer obtain from an outside road traffic information center the outside information relating to the road conditions of the electrified road section at which that apparatus is installed like in the first embodiment.

Third Embodiment

Next, a third embodiment of the present invention will be explained. The present embodiment differs from the above-mentioned embodiments on the point of deleting a second ticket based on the running path of each vehicle 3. Below, the explanation will be given focusing on this point of difference.

Figure 8:
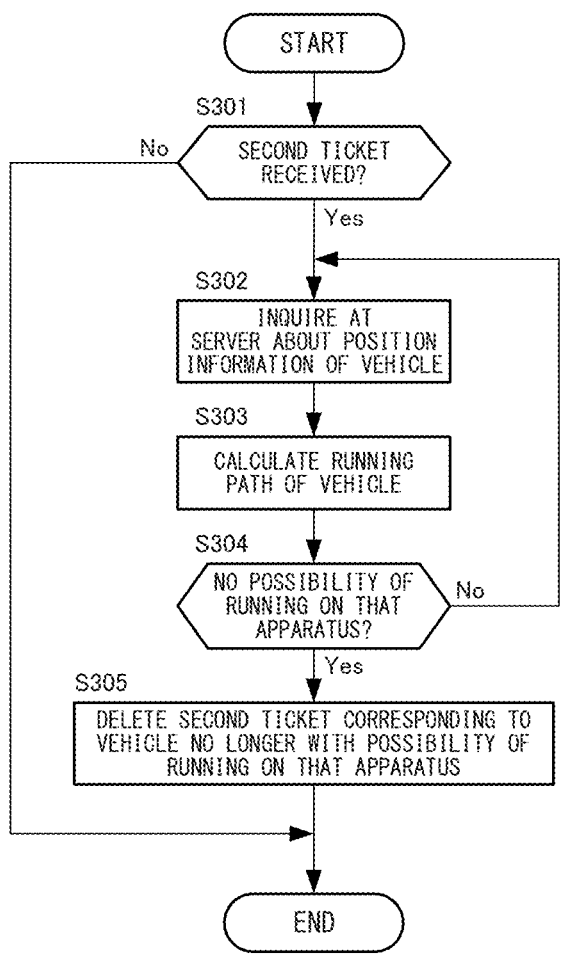
FIG. 8 is a flow chart for explaining processing for deletion of a second ticket according to a third embodiment of the present invention.

FIG. 8 is a flow chart for explaining processing for deletion of the second ticket according to the present embodiment. The power transmission controller 22 repeatedly performs the present routine at predetermined periods.

At step S301, the power transmission controller 22 of the ground power supply apparatus 2 judges if it has received the second ticket from the server 1. If receiving the second ticket from the server 1, the power transmission controller 22 proceeds to the processing of step S302. On the other hand, if not receiving the second ticket from the server 1, the power transmission controller 22 ends the current processing.

At step S302, the power transmission controller 22 of the ground power supply apparatus 2 inquires at the server 1 about the position information of the vehicle 3 holding the first ticket corresponding to the received second ticket. Note that, in the present embodiment, it is assumed that position information of the host vehicle is periodically transmitted to the server 1 if the vehicle 3 passes the checkpoint.

At step S303, if receiving from the server 1 position information of the vehicle 3 holding the first ticket corresponding to the second ticket, the power transmission controller 22 of the ground power supply apparatus 2 calculates the running path of the vehicle 3 based on position information of the vehicle 3 received up to then.

At step S304, the power transmission controller 22 of the ground power supply apparatus 2 judges whether there is no longer a possibility of that vehicle 3 running on that apparatus based on the running path of the vehicle 3 calculated at step S303.

When judging that there is no longer a possibility of the vehicle 3 running on that apparatus, the power transmission controller 22 proceeds to the processing of step S305. On the other hand, when judging that is a possibility of the vehicle 3 running on that apparatus, the power transmission controller 22 returns to the processing of step S302 after a predetermined time period elapses.

Figure 9:
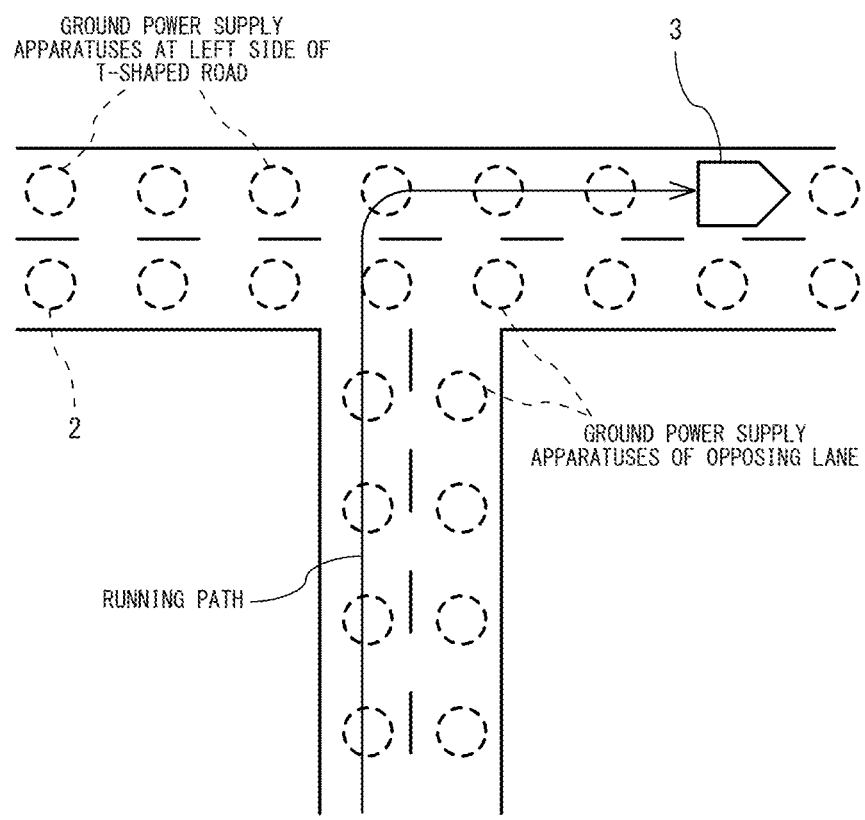
FIG. 9 is a view for explaining an example of a case of deletion of a second ticket based on a running path of a vehicle.

Giving one example of the case where there is no possibility of the vehicle 3 running on that apparatus, for example, as shown in FIG. 9, in the case where there is a T-shaped road at an electrified road section after passing a checkpoint, the power transmission controllers 22 of the ground power supply apparatuses 2 arranged at the left side in the figure of the T-shaped road can judge that there is no possibility of the vehicle 3 running on those apparatuses when able to judge based on the running path that the vehicle 3 has turned right (that is, when it can be judged that the vehicle 3 is running in a direction away from those apparatuses). Further, the power transmission controllers 22 can judge that there is no possibility of the vehicle 3 running on those apparatuses when able to judge based on the running path that the vehicle 3 is running in an opposing lane with a direction of advance opposite to the lane in which those apparatuses are installed.

At step S305, the power transmission controller 22 of the ground power supply apparatus 2 deletes the second ticket corresponding to the vehicle 3 for which there is no longer a possibility of running on that apparatus among the second tickets stored in the storage part 222.

According to the present embodiment explained above, the power transmission controller 22 (control device) is configured to delete the second ticket (identification information of mobile unit) received from the server 1 and stored in the storage part 222 (storage device) when judging based on the running path of the vehicle 3 (mobile unit) that there is no longer a possibility of the vehicle 3 running on the road at which the ground power supply apparatus 2 is installed.

Specifically, the power transmission controller 22 is configured to judge that there is no longer a possibility of the vehicle 3 running on the road at which the ground power supply apparatus 2 is installed when it could confirm, based on the running path of the vehicle 3, that the vehicle 3 is running in a direction away from the ground power supply apparatus 2. Further, the power transmission controller 22 is configured to judge that there is no longer a possibility of the vehicle 3 running on the road at which the ground power supply apparatus 2 is installed when it could confirm, based on the running path of the vehicle 3, that the vehicle 3 is running in an opposing lane with a direction of advance opposite to the lane in which the apparatus 2 is installed.

Due to this, the ground power supply apparatus 2 can delete the second ticket for identifying a vehicle 3 which as a result did not run on that apparatus from the storage part 222 of that apparatus at a suitable timing based on the running path of the vehicle 3 even if receiving that second ticket from the server 1.

Above, embodiments of the present invention were explained, but the above embodiments just show some of the examples of application of the present invention and are not intended to limit the technical scope of the present invention to the specific constitutions of the above embodiments.

For example, in the above first embodiment, the ground power supply apparatus 2 had obtained a grasp of the current road conditions based on outside information obtained by communicating with an outside road traffic information center, but the invention is not limited to this. For example, it is also possible to calculate the speed of passage of a vehicle being supplied with power etc. based on the duration of transmitting power to the vehicle being supplied with power and thereby judge the current road conditions. In this case, the slower the speed of passage, the higher the degree of congestion that can be judged.

Further, in the above third embodiment, the ground power supply apparatus 2 had calculated the running path of the vehicle 3, but the server 1 may also calculate the running path of the vehicle 3 and transmit the calculated running path of the vehicle 3 to the ground power supply apparatus 2.

Figure 10:
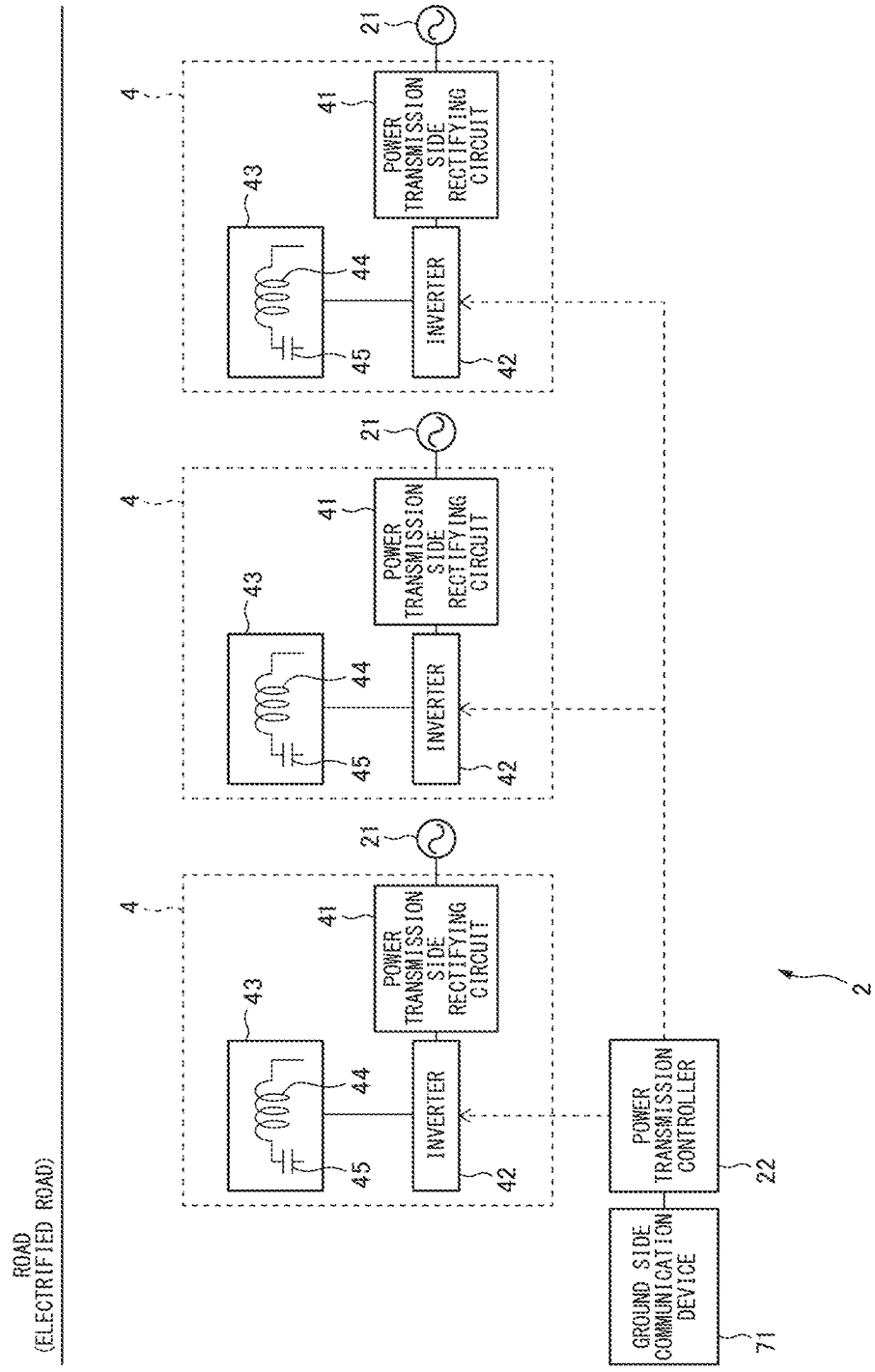
FIG. 10 is a view for explaining an example of ground power supply apparatuses and their configurations.

Further, in the above-mentioned embodiments, as shown in FIG. 10, the ground power supply apparatus 2 may, for example, be provided with a plurality of power transmission devices 4 controlled by a single power transmission controller 22.

Further, in the above-mentioned embodiments, it is also possible to successively delete second tickets in order from the oldest date received from the server 1 if the stored data of the storage part 222 of the ground power supply apparatus 2 becomes greater than or equal to a predetermined size.

Further, in the above-mentioned embodiments, the ground power supply apparatus 2 had deleted the second ticket corresponding to the vehicle 3 from the storage part 222 at the timing of transmitting power to the vehicle 3 running on the apparatus, the timing when the ticket storage time period of the second ticket corresponding to the vehicle 3 became greater than or equal to a ticket deletion time period, or the timing when judging from the running path of the vehicle 3 that there was no possibility of that vehicle 3 running on the apparatus, but at those timings, to prevent the vehicle 3 from being supplied with power by noncontact even if the second ticket stored in the storage part 222 matched the first ticket received from the vehicle 3, it is also possible to invalidate the second ticket corresponding to that vehicle 3 or to not immediately delete the second ticket, but delete it after performing predetermined processing.

As the predetermined processing, since power is made to be not supplied to the vehicle 3 by noncontact even if the second ticket stored in the storage part 222 and the first ticket received from the vehicle 3 match, it is possible to perform invalidation processing for invalidating the second ticket corresponding to that vehicle 3 at the above-mentioned timing.

Further, as the predetermined processing, after performing invalidation processing, it is possible to perform transmission processing for transmitting to the server 1 information relating to a deleted second ticket (if having deleted it at the first timing among the above-mentioned three timings, the identification information of the vehicle 3 running on the apparatus, while if having deleted it at the remaining two timings, identification information of the vehicle 3 not running on the apparatus). The server 1 can use the information relating to the second ticket received from the ground power supply apparatus 2 and deleted to, for example, identify a vehicle 3 utilizing the ground power supply apparatus 2 and calculate the usage charge.

Note that, the time period from when invalidating the second ticket to when deleting it is not particularly limited, but, for example, as the time period until the stored data reaches greater or equal to a predetermined size or more, it is possible to invalidate the second ticket corresponding to the vehicle 3 received from the server 1 and stored in the storage part 222 at the above-mentioned timing, then delete the second ticket invalidated at the stage when the stored data becomes a predetermined size or more. Further, the time period from when invalidating the second ticket to when deleting it may also be made the time period up to performing the transmission processing and may be made a predetermined fixed time period.

In the above way, the above-mentioned embodiments may also change the timing of invalidating the second ticket received from the server 1 and stored in the storage part 222 based on the road conditions around the road at which the ground power supply apparatus 2 is installed or the running path of the vehicle 3. Further, it is also possible to change the configuration so as to perform predetermined processing, then delete the second ticket stored in the storage part 222 when the elapsed time from when receiving the second ticket from the server 1 (ticket storage time period) becomes greater than or equal to a predetermined ticket deletion time or when, based on running path of the vehicle 3, there is no longer a possibility of the vehicle 3 running on the road at which the ground power supply apparatus 2 is installed.

Further, the above-mentioned embodiments can be suitably and freely combined.

Further, the above-mentioned embodiments, if changing the way of looking at them, can also be interpreted as a method of control of the ground power supply apparatus 2 provided with the ground side communication device 71 (communication device) able to communicate with the server 1 and the vehicle 3 (mobile unit) respectively and the storage part 222 (storage device), which method of control of the ground power supply apparatus 2 supplies power to the vehicle 3 by noncontact if the second ticket (identification information of the mobile unit) received from the server 1 and stored in the storage part 222 matches the first ticket (identification information of the mobile unit) received from the vehicle 3 and changes the timing of deletion of the second ticket received from the server 1 and stored in the storage device 222 from the storage device 222 based on the road conditions around the road at which the ground power supply apparatus 2 is installed.

1 server
2 ground power supply apparatus
3 vehicle (mobile unit)
11 server communication part (communication part)
13 server processing part (processing part)
100 noncontact power supply system

The invention claimed is:

1. A ground power supply apparatus comprising:
a communication device configured to be able to communicate with a server and a mobile unit; and
a control device having a storage device and configured to supply power to the mobile unit by noncontact if identification information of the mobile unit received from the server and stored in the storage device matches identification information of the mobile unit received from the mobile unit, wherein
the control device is configured to change a timing of deletion of identification information of the mobile unit received from the server and stored in the storage device from the storage device or the timing of invalidation of the identification information of the mobile unit received from the server and stored in the storage device based on the road conditions around the road at which the ground power supply apparatus is installed or the running path of the mobile unit.

2. The ground power supply apparatus according to claim 1, wherein
the control device is configured to:
delete the identification information of the mobile unit received from the server and stored in the storage device or invalidate it when an elapsed time from when receiving the identification information of the mobile unit from the server becomes greater than or equal to a predetermined time period; and
change the predetermined time period based on current or past road conditions around the road at which the ground power supply apparatus is installed.

3. The ground power supply apparatus according to claim 2, wherein
the control device is configured to make the predetermined time period longer when a degree of congestion of the road at which the ground power supply apparatus is installed is high compared to when it is low.

4. The ground power supply apparatus according to claim 3, wherein
the control device is configured to judge the degree of congestion of the road at which the ground power supply apparatus is installed based on at least one of an amount of traffic, length of congestion, average speed of the vehicles, and vehicle average passage time.

5. The ground power supply apparatus according to claim 2, wherein
the control device is configured to:
calculate a required time period from when receiving the identification information of the mobile unit from the server to when supplying power to the mobile unit by noncontact each time supplying power to the mobile unit by noncontact and storing it in the storage device; and
change the predetermined time period based on statistical data of the required time period obtained from a plurality of data of the required time period stored in the storage device.

6. The ground power supply apparatus according to claim 1, wherein
the control device is configured to delete the identification information of the mobile unit received from the server and stored in the storage device or invalidate the identification information of the mobile unit received from the server and stored in the storage device when judging based on a running path of the mobile unit that there is no longer a possibility of the mobile unit running on the road at which the ground power supply apparatus is installed.

7. The ground power supply apparatus according to claim 6, wherein
the control device is configured to judge that there is no longer a possibility of the mobile unit running on the road at which the ground power supply apparatus is installed when it was confirmed based on the running path of the mobile unit that the mobile unit was running in a direction away from the ground power supply apparatus.

8. The ground power supply apparatus according to claim 6, wherein the control device is configured to judge that there is no longer a possibility of the mobile unit running on the road at which the ground power supply apparatus is installed when able to confirm the mobile unit is running in an opposing lane with a direction of advance opposite to the lane at which the ground power supply apparatus is installed based on the running path of the mobile unit.

9. The ground power supply apparatus according to claim 1, wherein
the control device is configured to calculate a running path of the mobile unit based on position information of the mobile unit received from the server or acquires it from the server.

10. The ground power supply apparatus according to claim 1, wherein
the control device is configured to perform predetermined processing, then delete the identification information of the mobile unit stored in the storage device when an elapsed time period from when receiving the identification information of the mobile unit from the server becomes greater than or equal to a predetermined time period or when it is judged based on the running path of the mobile unit that there is no longer a possibility of the mobile unit running on the road at which the ground power supply apparatus is installed,
the predetermined processing including invalidation processing for invalidating the identification information of the mobile unit stored in the storage device so that even if the identification information of the mobile unit stored in the storage device matches the identification information of the mobile unit received from the mobile unit, the mobile unit is not supplied with power by noncontact.

11. The ground power supply apparatus according to claim 10, wherein
the predetermined processing further includes transmission processing for transmitting the invalidated identification information of the mobile unit to the server after the invalidation processing.

12. A noncontact power supply system comprising:
a server;
a mobile unit; and
a ground power supply apparatus having a storage device and configured to be able to communicate with the server and the mobile unit respectively and configured to be able to supply power to the mobile unit by noncontact, wherein
the ground power supply apparatus is configured to:
supply power to the mobile unit by noncontact if identification information of the mobile unit received from the server and stored in the storage device matches identification information of the mobile unit received from the mobile unit; and
change a timing of deletion of identification information of the mobile unit received from the server and stored in the storage device from the storage device or the timing of invalidating the identification information of the mobile unit received from the server and stored in the storage device based on the road conditions around the road at which the ground power supply apparatus is installed or the running path of the mobile unit.

13. A control method for a ground power supply apparatus, wherein
the ground power supply apparatus comprises:

a communication device configured to be able to communicate with a server and a mobile unit respectively; and a storage device, and the control method includes:

supplying power to the mobile unit by noncontact if identification information of the mobile unit received from the server and stored in the storage device matches identification information of the mobile unit received from the mobile unit; and changing a timing of deletion of identification information of the mobile unit received from the server and stored in the storage device from the storage device or the timing of invalidating the identification information of the mobile unit received from the server and stored in the storage device based on the road conditions around the road at which the ground power supply apparatus is installed or the running path of the mobile unit.

14. A nontransitory computer storage medium including a computer program for a computer for controlling a ground power supply apparatus, wherein the ground power supply apparatus comprises:

a communication device configured to be able to communicate with a server and a mobile unit respectively; and a storage device, and the computer program makes the ground power supply apparatus:

supply power to the mobile unit by noncontact if identification information of the mobile unit received from the server and stored in the storage device matches identification information of the mobile unit received from the mobile unit; and change the timing of deletion of identification information of the mobile unit received from the server and stored in the storage device from the storage device or the timing of invalidating the identification information of the mobile unit received from the server and stored in the storage device based on the road conditions around the road at which the ground power supply apparatus is installed or the running path of the mobile unit.

* * * * *